US008482554B2

(12) United States Patent
Lee

(10) Patent No.: US 8,482,554 B2
(45) Date of Patent: Jul. 9, 2013

(54) DEVICE AND METHOD FOR DRIVING LIQUID CRYSTAL DISPLAY DEVICE

(75) Inventor: Ju-Young Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 183 days.

(21) Appl. No.: 12/958,681

(22) Filed: Dec. 2, 2010

(65) Prior Publication Data

US 2011/0128279 A1 Jun. 2, 2011

(30) Foreign Application Priority Data

Dec. 2, 2009 (KR) ........................ 10-2009-0118250

(51) Int. Cl.
*G06F 3/038* (2006.01)
*G06G 5/00* (2006.01)

(52) U.S. Cl.
USPC ................ 345/212; 345/87; 345/94; 345/100

(58) Field of Classification Search
USPC ................................................ 345/87, 99, 96
See application file for complete search history.

(56) References Cited

U.S. PATENT DOCUMENTS

| | | | | |
|---|---|---|---|---|
| 7,126,573 | B2 * | 10/2006 | Park et al. | 345/94 |
| 7,196,683 | B2 * | 3/2007 | Yamamoto et al. | 345/87 |
| 7,205,969 | B2 * | 4/2007 | Song | 345/87 |
| 2002/0101415 | A1 | 8/2002 | Song | |
| 2004/0032385 | A1 | 2/2004 | Park et al. | |
| 2006/0152462 | A1 | 7/2006 | Furihata et al. | |
| 2008/0001900 | A1 * | 1/2008 | Park | 345/100 |
| 2010/0085348 | A1 * | 4/2010 | Bae et al. | 345/213 |

FOREIGN PATENT DOCUMENTS

| | | | |
|---|---|---|---|
| CN | 1689067 | A | 10/2005 |
| CN | 1804988 | A | 7/2006 |
| CN | 101436368 | A | 11/2007 |
| KR | 10-2002-0048693 | A | 6/2002 |
| KR | 10-2004-0013785 | A | 2/2004 |
| KR | 10-2008-0000753 | A | 1/2008 |
| WO | 2004025618 | A1 | 3/2004 |

OTHER PUBLICATIONS

Chinese Office Action (Application No. 201010573119.X) dated May 12, 2012.
Chinese Office Action in counterpart Chinese Application No. 201010573119.X, dated Nov. 16, 2012.
KIPO—Office Action for Korean Patent Application No. 10-2009-0118250—Issued on Apr. 28, 2013.

* cited by examiner

*Primary Examiner* — Alexander S Beck
*Assistant Examiner* — Ibrahim Khan
(74) *Attorney, Agent, or Firm* — Morgan, Lewis & Bockius LLP

(57) ABSTRACT

A device for driving a liquid crystal display device includes a liquid crystal panel having a plurality pixel regions formed thereon, a data driver to drive data lines on the liquid crystal panel, a gate driver to drive gate lines on the liquid crystal panel, a driving voltage generating unit to generate a common voltage wherein a level of the common voltage swings every frame, and a timing controller to control the driving voltage generating unit and the gate driver to generate a gate driving voltage wherein a level of the gate driving voltage varies in accordance with the common voltage swinging level.

18 Claims, 5 Drawing Sheets

DEVICE AND METHOD FOR DRIVING LIQUID CRYSTAL DISPLAY DEVICE

This application claims the benefit of the Korean Patent Application No. 10-2009-0118250, filed on Dec. 2, 2009, which is hereby incorporated by reference.

BACKGROUND OF THE INVENTION

1. Field of the Invention

The present invention relates to liquid crystal display devices, and more particularly, to a device and a method for driving a liquid crystal display device in which the level of a gate driving voltage is varied in accordance with a swinging level of a common voltage to prevent distortion of an image signal being charged to each pixel region, thereby improving display quality of the image.

2. Discussion of the Related Art

With increased use of flat display devices, several flat panel technologies have emerged. There are liquid crystal display devices, field emission display devices, plasma display panel, light emitting display devices, and so on. Of the flat display devices, liquid crystal display devices, having excellent resolution, color expression and picture quality, are actively applied to notebook computers, desk top monitors, and mobile terminals.

Liquid crystal display devices display pictures by controlling light transmissivity of liquid crystals using an electric field. The liquid crystal display device is provided with a liquid crystal panel having a plurality of pixel cells for displaying the picture, a driving circuit for driving the liquid crystal panel, and a backlight unit for directing a light to the liquid crystal panel.

The liquid crystal panel controls transmissivity of the light from the backlight unit for displaying a desired picture with the plurality of pixel cells. The pixel cells receive an image signal from the data lines in response to a gate driving voltage received through the gate lines and vary an array of the liquid crystal molecules therein to control light transmissivity.

Consequently, in the related art, in order to increase the response speed of the liquid crystals and save power consumption of the liquid crystal panel, the level of the common voltage is made to swing in accordance with a polarity of the image signal before the common voltage is supplied to the liquid crystal panel. In particular, in order to increase the difference between the level of the image signal charged to each pixel cell and the level of the common voltage, the level of the common voltage is configured to swing such that a polarity and a magnitude of the image signal are opposite to that of the common voltage.

However, the related art common voltage swing causes distortion of image signals, resulting in poor display quality when the common voltage swing is applied to a large sized liquid crystal panel. In particular, because large sized liquid crystal panels are recently widely used, the related art common voltage swing is applied to the large sized liquid crystal panel, wherein an image signal charge time difference between an upper side and a lower side of the liquid crystal panel is large. Therefore, the display quality of the image becomes poor because of the difference of charge quantities of the image signal or the change of the voltage difference between the common voltage and the image signal.

SUMMARY OF THE INVENTION

Accordingly, the present invention is directed to a device and a method for driving a liquid crystal display device.

An object of the present invention is to provide a device and a method for driving a liquid crystal display device in which a level of a gate driving voltage is varied in accordance with a swinging level of a common voltage to prevent an image signal being charged to each pixel region from being distorted, thereby improving the display quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for driving a liquid crystal display device includes a liquid crystal panel having a plurality pixel regions formed thereon, a data driver to drive data lines on the liquid crystal panel, a gate driver to drive gate lines on the liquid crystal panel, a driving voltage generating unit to generate a common voltage wherein a level of the common voltage swings every frame, and a timing controller to control the driving voltage generating unit and the gate driver to generate a gate driving voltage wherein a level of the gate driving voltage varies in accordance with the common voltage swinging level.

In another aspect, a method for driving a liquid crystal display includes generating a common voltage wherein a level of the common voltage swings every frame, supplying the generated common voltage to a liquid crystal panel, and controlling a gate driver to generate a gate driving voltage wherein a level of the gate driving voltage varies in accordance with the common voltage swinging level.

In another aspect, the device includes a liquid crystal panel having a plurality pixel regions formed thereon, a data driver to drive data lines on the liquid crystal panel, a gate driver to drive gate lines on the liquid crystal panel, a driving voltage generating unit to generate a common voltage wherein a level of the common voltage swings every $n^{th}$ frame, wherein n is an integer equal to or greater than 2, and a timing controller to control the driving voltage generating unit and the gate driver to generate a gate driving voltage wherein a level of the gate driving voltage varies in accordance with the common voltage swinging level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
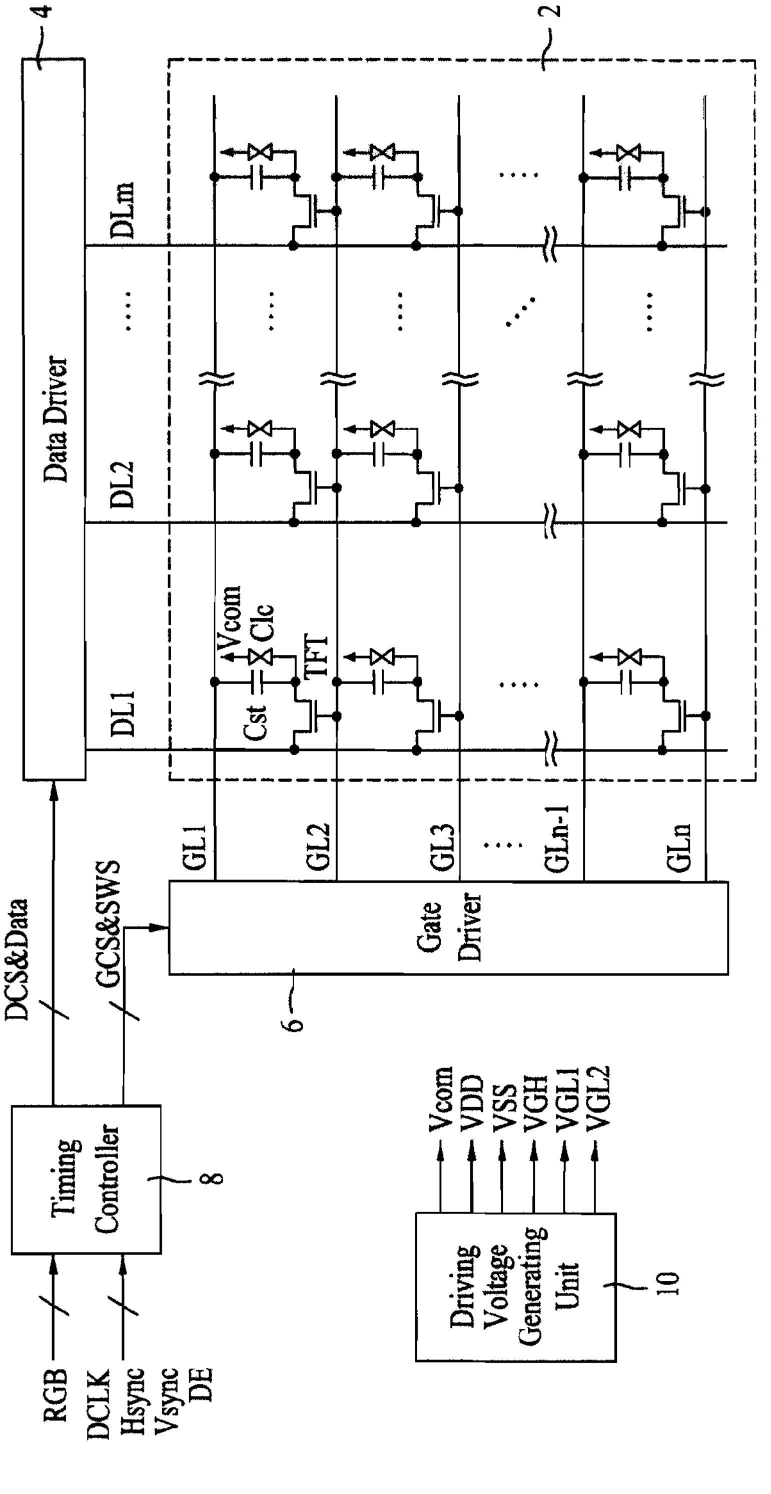
FIG. 1 illustrates a circuit diagram of a driving unit of a liquid crystal display device in accordance with an exemplary embodiment of the present invention.

FIG. 1 illustrates a circuit diagram of a driving unit of a liquid crystal display device in accordance with an exemplary embodiment of the present invention. As shown in FIG. 1, the liquid crystal display device includes a liquid crystal panel 2 having a plurality of pixel regions, a data driver 4 for driving a plurality of data lines DL1 to DLm on the liquid crystal panel 2, a gate driver 6 for driving a plurality of gate lines GL1 to GLn on the liquid crystal panel 2, a driving voltage generating unit 10 for generating a common voltage Vcom having a voltage level which swings at least in each frame and supplying the common voltage to the liquid crystal panel 2, and a timing controller 8 for controlling the driving voltage generating unit 10 and the gate driver 6 such that the gate driver 6 changes a level of the gate driving voltage in accordance with a swinging level of the common voltage Vcom. The gate driver 6 then supplies the changed gate driving voltage to the gate lines GL1~GLn.

The liquid crystal panel 2 has a thin film transistor TFT formed at each pixel region defined by the plurality of gate lines GL1 to GLn and data lines DL1 to DLm, and a liquid crystal capacitor Clc connected to the thin film transistor TFT. The liquid crystal capacitor Clc has a pixel electrode connected to the thin film transistor TFT, and a common electrode facing the pixel electrode with liquid crystals disposed therebetween. The thin film transistors TFT supply the picture signals from the data lines DL1 to DLm to the pixel electrodes in response to scan pulses from the gate lines GL1 to GLn, respectively. The liquid crystal capacitor Clc has a voltage difference corresponding to the difference between the voltage of the picture signal supplied to the pixel electrode and the common voltage supplied to the common electrode. This voltage difference between the pixel electrode and the common electrode varies the arrangement of liquid crystal molecules to control light transmissivity. The liquid crystal capacitor Clc is connected to the storage capacitor Cst in parallel to sustain the voltage charged to the liquid crystal capacitor Clc until the next data signal is supplied. The storage capacitor Cst is formed as the pixel electrode is overlapped with a gate line with an insulating film disposed therebetween. Alternatively, the storage capacitor Cst may also be formed as the pixel electrode is overlapped with the storage line with the insulating film disposed therebetween.

The data driver 4 receives an aligned picture data Data and data control signals DCS from the timing controller 8 for driving the data lines DL1~DLm. In particular, the data driver 4 converts the aligned picture data Data into an analog picture data, i.e., a picture signal using a source start pulse SSP and a source shift clock SSC of data control signals DCS received, and supplies one horizontal line portion of the picture signal to the data lines DL1 to DLm in every horizontal period in which the scan pulse is supplied to the gate lines GL1 to GLn. In this instance, the data driver 4 supplies the picture signal to the data lines DL1 to DLm in response to a source output enable SOE signal. In particular, the data driver 4 latches the picture data Data received in response to the SSC and supplies the one horizontal line portion of the picture signal to the data lines DL1 to DLm in every horizontal period in which a gate on signal (or scan pulse) is supplied to the gate lines GL1 to GLn in response to the SOE signal.

The gate driver 6 receives a gate control signal GCS and a gate output control signal SWS from the timing controller 8 to generate a plurality of gate driving voltages for driving the gate lines GL1~GLn in succession. In particular, the gate driver 6 generates and forwards gate on signals (or the scan pulses) using gate control signals GCS for driving the gate lines GL1~GL in succession. In a period when no gate on voltages are supplied to the gate lines GL1 to GLn, the gate driver 6 changes levels of gate off voltages in accordance with the swinging levels of the common voltage Vcom using the gate output control signal SWS and forwards the changed gate off voltages.

In particular, the gate driver 6 of the present invention generates the gate on voltages in succession using a gate start pulse GSP and a gate shift clock GSC of the gate control signal GCS, controls an output period of the gate on voltage, i.e., a pulse width of the gate on signal, in response to the gate output enable GOE signal, and forwards the gate on signals to the gate lines GL1 to GLn in succession. The gate driver 6 changes the levels of the gate off voltages to a first or second off voltage levels according to the gate output control signal SWS and supplies the gate off voltages in a period where no gate on voltages are supplied to the gate lines GL1~GLn. Configuration and operation of the gate driver 6 will be described in more detail with reference to the attached drawings.

The driving voltage generating unit 10 generates a plurality of driving voltages for driving the liquid crystal display device, e.g., positive and negative driving voltages VDD and VSS, first and second low voltages VGL1 and VGL2, a gate high voltage VGH, and the common voltage Vcom having a voltage level swinging in at least every frame. The common voltage Vcom having a swinging voltage level is varied with an inversion driving method of the liquid crystal panel 2. If a frame inversion driving method is applied, the common voltage can be generated to have a voltage level swinging in at least every frame. For example, among the data control signals DCS from the timing controller 8, a polarity control signal (e.g., the POL signal) which controls a polarity of the image signal, can also be supplied to the driving voltage generating unit 10 when the driving voltage generating unit 10 applies the inversion driving method according to the polarity control signal, and changes a swing unit of the common voltage Vcom accordingly. The common voltage Vcom thus generated is supplied to the common electrodes of the liquid crystal panel 2.

The timing controller 8 controls the driving voltage generating unit 10 to generate the common voltage Vcom in conformity with the inversion driving method of the liquid crystal panel 2. For example, if the liquid crystal panel 2 is driven by the frame inversion method, the timing controller 8 supplies the polarity control signal, the voltage level of which swings in at least every frame, to the driving voltage generating unit 10. The driving voltage generating unit 10 generates the common voltage Vcom which swings in at least every frame in response to the polarity control signal.

The timing controller 8 receives and aligns external image data RGB suitable for driving the liquid crystal panel 2, and the aligned image data Data is supplied to the data driver 4. The timing controller 8 controls the gate and data drivers 6 and 4 using at least one of synchronizing signals supplied from an outside, i.e., a dot clock DCLK, a data enable signal DE, and horizontal and vertical synchronizing signals Hsync and Vsync. In particular, the timing controller 8 generates the gate control signal GCS, the gate output control signal SWS and the data control signal DCS using at least one of the synchronizing signals, and supplies the control signals GCS, SWS, and DCS to the gate and data drivers 6 and 4, respectively. The gate control signal GCS is generated such that the gate driver 6 can supply a gate on voltage to the gate lines GL1~GLn in succession. The gate output control signal SWS is generated for changing the level of the gate off voltage in conformity with the level of the common voltage Vcom and during a period in which no gate on voltage is supplied, i.e., during a period in which the charged image signal is sustained.

Figure 2:
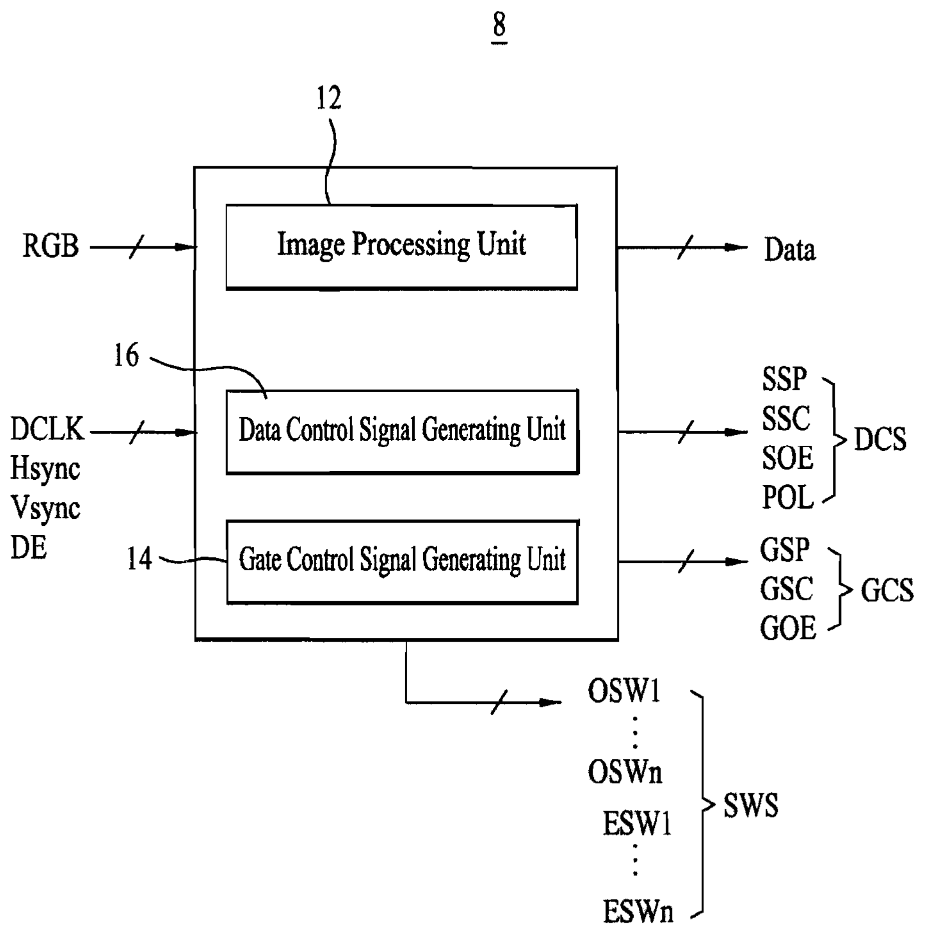
FIG. 2 illustrates an exemplary circuit diagram of the timing controller in FIG. 1.

FIG. 2 illustrates an exemplary circuit diagram of the timing controller in FIG. 1. As shown in FIG. 2, the timing controller 8 includes an image processing unit 12 for receiving and aligning an external image data RGB suitable for driving of the liquid crystal panel 2 and supplying the aligned image data RGB to the data driver 4, a data control signal generating unit 16 for using at least one of external synchronizing signals DCLK, Vsync, Hsync, and DE to generate the data control signal DCS and supply the data control signal DCS to the data driver 4, and a gate control signal generating unit 14 for generating the gate control signal GCS for enabling supplying the gate on voltage to the gate lines GL1~GLn in succession and the gate output control signal SWS which enables changing the level of the gate off voltage and supply the gate off voltage having the changed level to the gate driver 6 during a period in which no gate on voltage is supplied.

The image processing unit 12 aligns the image signal RGB, suitable for driving of the liquid crystal panel 2 using at least one of the synchronizing signals DCLK, Hsync, Vsync, and DE, and the aligned image data Data, to the data driver 4.

The data control signal generating unit 16 generates the SSC, SSP including the SOE signal and the POL signal which is a polarity control signal using at least one of the external synchronizing signals DCLK, Hsync, Vsync, and DE (e.g., the data enable signal DE and the vertical synchronizing signal Vsync). In this instance, data control signal generating unit 16 changes the voltage level of the POL signal according to a preset inversion method of the liquid crystal panel 2 in generating the POL signal. The generated data control signal DCS is supplied to the data driver 4. In particular, the POL signal which changes the polarity of the image signal being supplied to the data lines DL1~DLm is also supplied to the driving voltage generating unit 10 together with the data driver 4.

The gate control signal generating unit 14 generates the gate control signal GCS, i.e., the GSP and GSC including the GOE using at least one of the external synchronizing signals DCLK, Hsync, Vsync, and DE, and supplies the gate control signal GCS to the gate driver 6. The gate control signal GCS is a signal for controlling a driving timing of the gate driver 6, i.e., a signal for enabling the gate driver 6 to supply the gate on voltage to the gate lines GL1~GLn in succession.

The gate control signal generating unit 14 generates gate output control signal SWS including first to $n^{th}$ odd switching signals OSW1~OSWn and first to $n^{th}$ even switching signals ESW1~ESWn using at least one of synchronizing signals DCLK, Hsync, Vsync, and DE, and supplies the gate output control signal SWS to the gate driver 6 together with the gate control signal GCS. In this instance, the gate output control signal SWS is a signal generated for changing the level of the gate off voltage in conformity with the level of the swinging common voltage Vcom during a period in which no gate on voltage is supplied, i.e., during a period in which the image signal charged at each pixel region is sustained, and supplying the changed gate off voltage.

Figure 3:
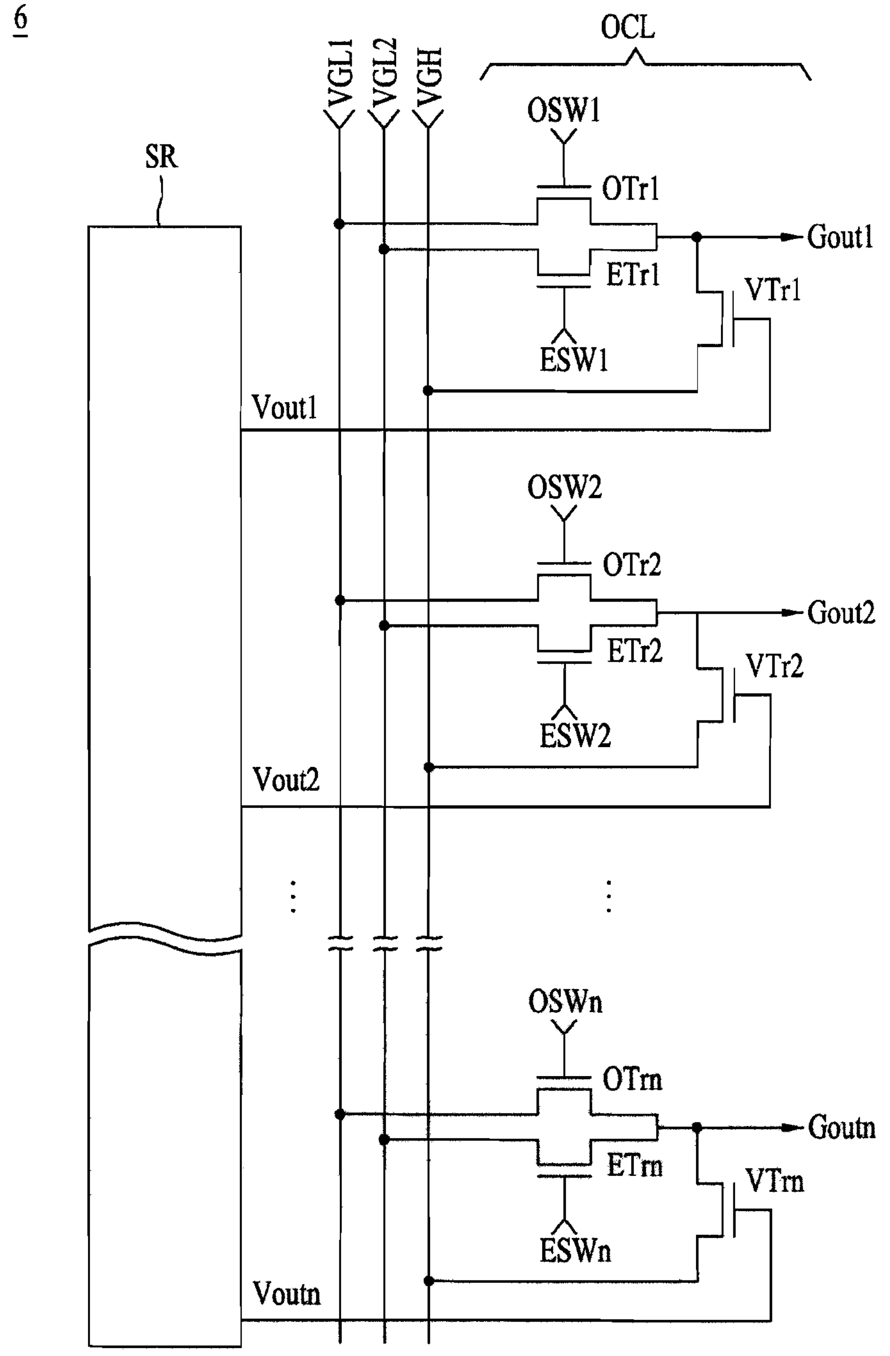
FIG. 3 illustrates an exemplary circuit diagram of the gate driver in FIG. 1.

FIG. 3 illustrates an exemplary circuit diagram of the gate driver in FIG. 1. As shown in FIG. 3, the gate driver 6 includes a shift register SR for generating and forwarding a plurality of scan pulses Vout1~Voutn according to the gate control signal GCS in succession, and an output voltage control unit OCL for supplying the plurality of gate on voltages Gout1~Goutn to the gate lines GL1~GLn according to a plurality of scan pulses Vout1~Voutn in succession and changing the gate off voltage to a first or second gate low voltage level according to the gate output control signal SWS and supplying to the gate lines GL1~GLn in the remaining period in which no gate on voltages Gout1~Gout2 are supplied.

The shift register SR generates the plurality of scan pulses Vout1~Voutn in succession using the GSP and GSC of the gate control signal GCS, and adjusts output periods of the plurality of scan pulses Vout1~Voutn, i.e., pulse widths of the plurality of scan pulses Vout1~Voutn according to the GOE signal. The plurality of scan pulses Vout1~Voutn are supplied to the output voltage control unit OCL in succession.

The output voltage control unit OCL generates a plurality of gate on voltages Gout1~Goutn in succession in correspondence to the plurality of scan pulses Vout1~Voutn respectively, and supplies the plurality of scan pulses Vout1~Voutn to the gate lines GL1~GLn in succession. In the remaining period in which no gate on voltages Gout1~Goutn are supplied, i.e., in a gate low voltage output period, the gate off voltage level is changed to first or second low voltage level according to the gate output control signal SWS.

The output voltage control unit OCL of the gate driver 6 includes a plurality of output switching devices VTr1~VTrn for forwarding the gate high voltage VGH as the gate on voltages Gout1~Goutn according to the plurality of scan pulses Vout1~Voutn respectively, first to $n^{th}$ odd switching devices OTr1~OTrn for forwarding the first gate low voltage VGL1 as the gate off voltage in response to the first to $n^{th}$ odd switching signals OSW1~OSWn of the gate output control signal SWS respectively, and first to $n^{th}$ even switching devices ETr1~ETrn for forwarding the second gate low voltage VGL2 as the gate off voltage in response to the first to $n^{th}$ even switching signals ESW1~ESWn of the gate output control signal SWS respectively.

The plurality of output switching devices VTr1~VTrn are provided between output terminals of the scan pulses Vout1~Voutn of the shift register SR and the output terminals of the gate driving voltages Gout1~Goutn, i.e., between gate on/off output terminals, for receiving the scan pulses Vout1~Voutn from the shift register SR, respectively. In this instance, the output switching devices VTr1~VTrn are turned on in succession in response to the scan pulses Vout1~Voutn supplied thereto in succession, and when turned on, forward the gate high voltage VGH to output terminals of the gate driving voltages Gout1~Goutn, i.e., to the gate lines GL1~GLn. The output switching devices VTr1~VTrn may be NMOS or PMOS transistors.

The first to $n^{th}$ odd switching devices OTr1~OTrn are provided between an input terminal of the first gate low voltage VGL1 and output terminals of the gate driving voltages Gout1~Goutn for receiving the first to $n^{th}$ odd switching signals OSW1~OSWn respectively. The first to $n^{th}$ odd switching devices OTr1~OTrn supply the first gate low voltage VGL1 to the gate lines GL1~GLn in response to the first to $n^{th}$ odd switching signals OSW1~OSWn, respectively.

The first to $n^{th}$ even switching devices ETr1~ETrn are provided between an input terminal of the second gate low voltage VGL2 and output terminals of the gate driving voltages Gout1~Goutn for receiving the first to $n^{th}$ even switching signals ESW1~ESWn respectively. The first to $n^{th}$ even switching devices ETr1~ETrn supply the second gate low voltage VGL2 to the gate lines GL1~GLn in response to the first to $n^{th}$ even switching signals ESW1~ESWn, respectively. The first to $n^{th}$ odd switching devices OTr1~OTrn and the first to $n^{th}$ even switching devices ETr1~ETrn may be NMOS or PMOS transistors, respectively.

Figure 4:
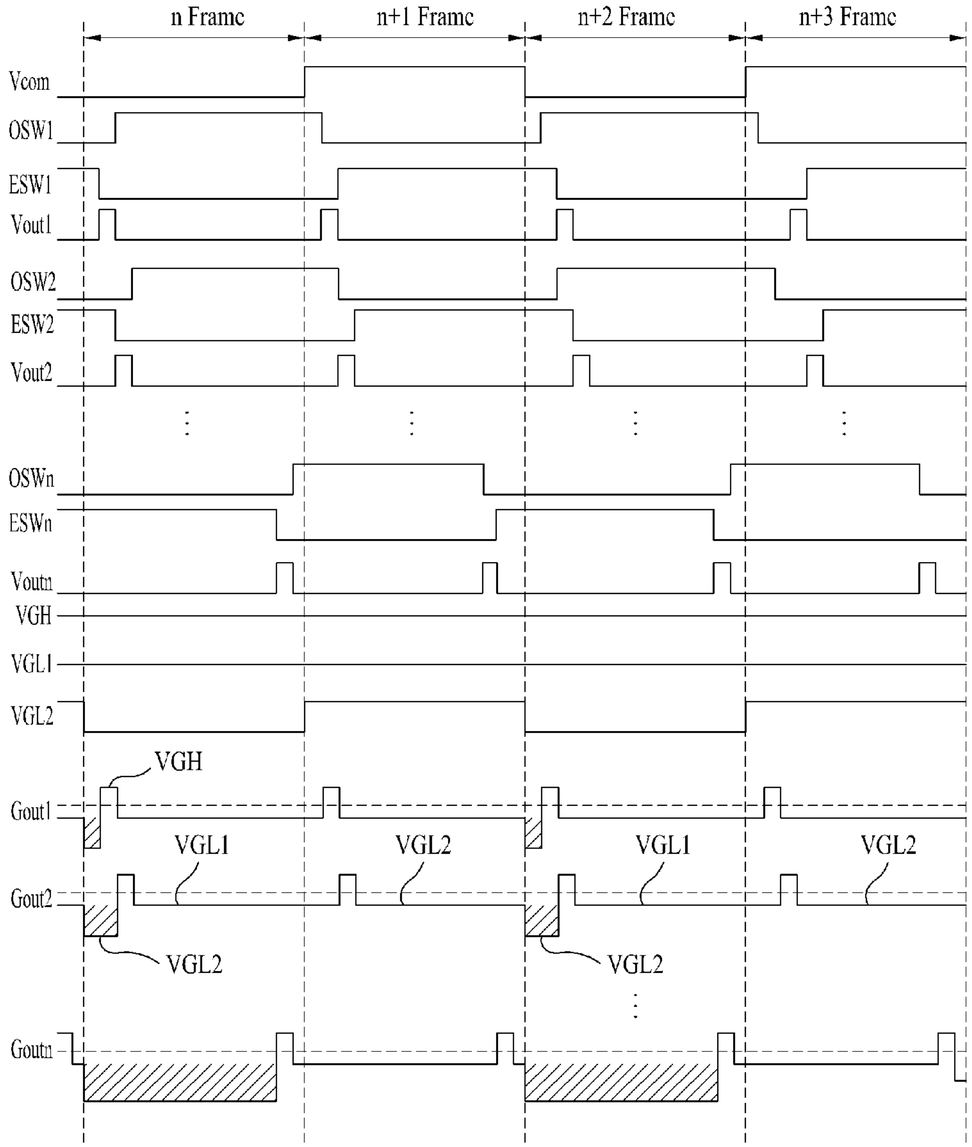
FIG. 4 illustrates an exemplary waveform diagram showing signals received at/forwarded from the gate driver in FIG. 3.

FIG. 4 illustrates an exemplary waveform diagram showing signals received at/forwarded from the gate driver in FIG. 3. As shown in FIG. 4, when the common voltage Vcom of the present invention is supplied to the liquid crystal panel 2 at the low level in the first frame period and at the high level in the second frame period, the plurality of scan pulses Vout1~Voutn are generated such that the gate on voltages Gout1~Goutn are supplied to the gate lines GL1~GLn in every frame, respectively.

The first to $n^{th}$ odd switching signals OSW1~OSWn are generated to turn on the first to $n^{th}$ odd switching devices OTr1~OTrn respectively after a period in which the gate on voltages Gout1~Goutn are supplied in a first frame period nFrame or n+2 Frame and before a period in which the gate one voltages Gout1~Goutn are supplied in a second frame period n+1 Frame or n+3 Frame The first to $n^{th}$ even switching signals ESW1~ESWn are generated to turn on the first to $n^{th}$ even switching devices ETr1~ETrn respectively before a period in which the gate on voltages Gout1~Goutn are supplied in the first frame period nFrame or n+2 Frame and after a period in which the gate one voltages Gout1~Goutn are supplied in the second frame period n+1 Frame or n+3 Frame. In this instance, the first frame period nFrame or n+2 Frame may be an odd numbered frame period and the second frame period n+1 Frame or n+3 Frame may be an even numbered frame period.

The first gate low voltage VGL1 is supplied to maintain a voltage level set lower than the gate high voltage VGH. The second gate low voltage level may be set and supplied to swing two voltage levels that are set lower than the first gate low voltage VGL1 in every frame. In particular, the second gate low voltage VGL2 supplies a voltage level lower than the first gate low voltage VGL1 level in the first frame period nFrame or n+2 Frame, and another voltage level equal to or lower than the first gate low voltage VGL1 level in the second frame period n+1 Frame or n+3 Frame.

Output waveforms of the gate driving voltages Gout1~Goutn, i.e., the gate on voltages Gout1~Goutn in FIG. 4, will be described in more detail. In the remaining period in which the gate on voltages are not supplied at the gate high voltage VGH level, i.e., the period in which the charged image signal is sustained, the level of the gate off voltage can be changed to the first or second low level and supplied in accordance with the swinging common voltage Vcom. In this case, since a differential voltage between the image signal and the common voltage Vcom, i.e., a charged amount of the image signal can be sustained without being distorted, and brightness and display quality of the displayed image can be improved.

Figure 5:
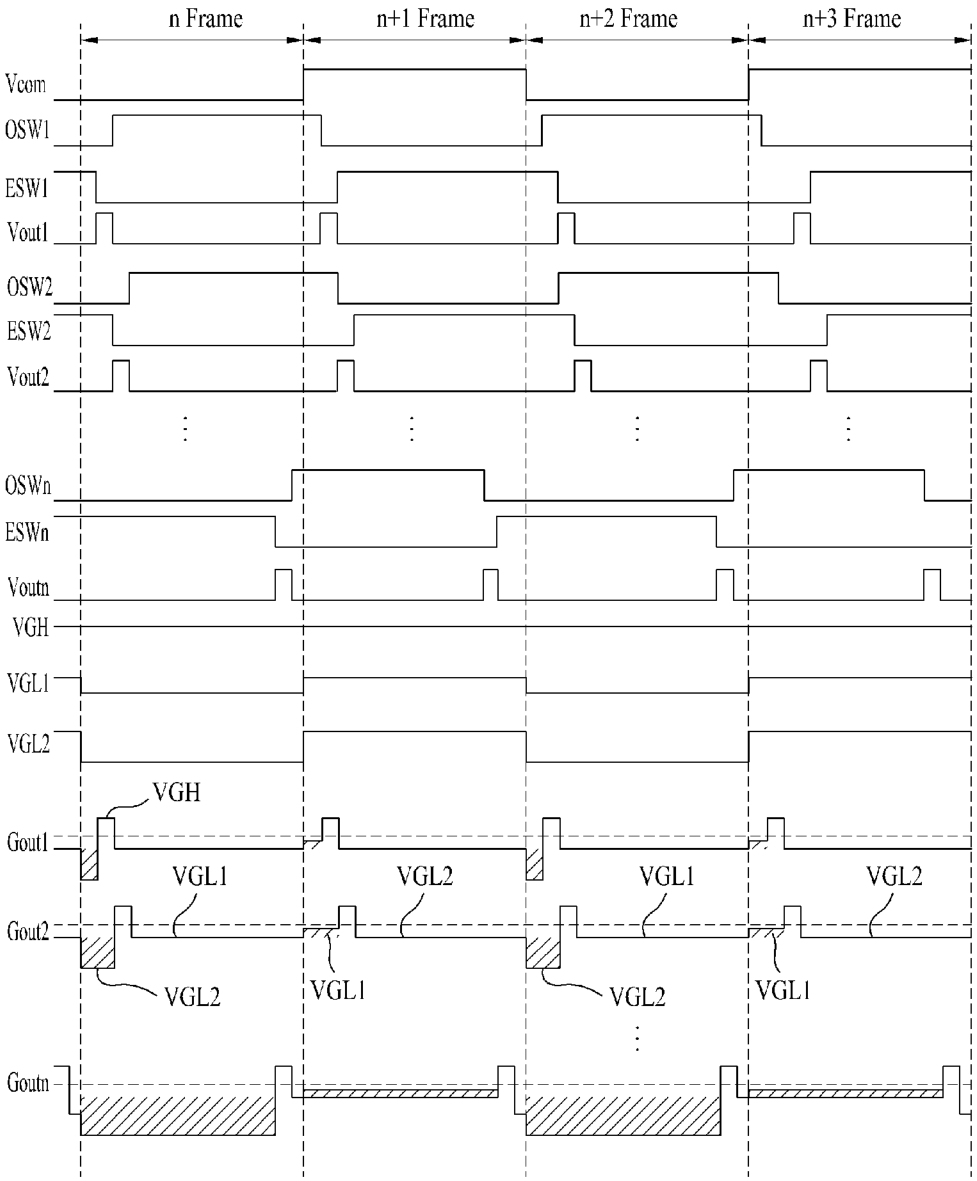
FIG. 5 illustrates another exemplary waveform diagram showing signals received at/forwarded from the gate driver in FIG. 3.

FIG. 5 illustrates another exemplary waveform diagram showing signals received at or forwarded from the gate driver in FIG. 3. FIG. 5 illustrates an example in which two voltage levels (i.e., the first gate low voltage VGL1 level is set lower than the gate high voltage VGH and higher than the second gate voltage VGL2) are set to swing in every frame. Though the first gate low voltage VGL1 level may be supplied to maintain one voltage level set lower than the gate high voltage VGH as shown in FIG. 4, two voltage levels set lower than the gate high voltage VGH and higher than the second gate low voltage VGL2 may be supplied to swing in every frame.

As shown in output waveforms of the gate on/off voltages Gout1~Goutn in FIG. 5, levels of the first and second low voltages VGL1 and VGL2 can be made to be supplied in a variety of forms according to the swing levels of the common voltage Vcom. In this case, the differential voltage of the image signal and the common voltage Vcom, i.e., the charged amount of the image signal, are made to maintain a level for improving brightness and display quality of the displayed image.

As has been described, the device and method for driving a liquid crystal display device of the present invention have the following advantages. In order to prevent a charged amount difference of the image signal between an upper side and a lower side of the liquid crystal panel 2 caused by a charge time difference of the image signal, the level of the gate driving voltage is varied with the swinging level of the common voltage Vcom and the charged amount of the image signal in supplying the gate driving voltage. The present invention can prevent the image signal charged to the pixel region from distorting, and improve the brightness and display quality of the displayed image. Moreover, the present invention can reduce power consumption and consequential heat generation by lowering the driving voltage required for driving the liquid crystal panel 2.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device, comprising:

a liquid crystal panel comprising a plurality pixel regions formed thereon;

a data driver to drive data lines on the liquid crystal panel;

a gate driver to drive gate lines on the liquid crystal panel;

a driving voltage generating unit to generate a common voltage, a level of the common voltage swinging every frame; and a timing controller to control the driving voltage generating unit and the gate driver to generate a gate driving voltage, a level of the gate driving voltage varying in accordance with the common voltage swinging level, wherein the timing controller comprises a gate control signal generating unit to generate a gate control signal to supply a gate on voltage to the gate lines, and a gate output control signal to change a level of a gate off voltage and supply the changed gate off voltage to the gate driver when the gate on voltage is not supplied, wherein first to $n^{th}$ odd switching signals of the gate output control signal are generated to forward a first gate low voltage as the gate off voltage after the gate on voltages are supplied in a first frame period, and before the gate on voltages are supplied in a second frame period, where "n" is an integer greater than 0, and wherein first to $n^{th}$ even switching signals are generated to forward a second gate low voltage as the gate off voltage before the gate on voltages are supplied in the first frame period, and after the gate on voltages are supplied in the second frame period.

2. The device in claim 1, wherein the timing controller comprises:

an image processing unit to receive and align an external image data and supply the aligned image data to the data driver; and a data control signal generating unit to generate a data control signal using at least one external synchronizing signal and supply the data control signal to the data driver.

3. The device in claim 2, wherein the gate driver comprises:

a shift register to generate and forward a plurality of scan pulses in response to the gate control signal; and an output voltage control unit to supply the plurality of gate on voltages to the gate lines in response to a plurality of scan pulses and change the gate off voltage to the first or second gate low voltage level in response to the gate output control signal and supply the changed gate off voltage to the gate lines when no gate on voltages are supplied.

4. The device in claim 3, wherein the output voltage control unit comprises:

a plurality of output switching devices to forward a gate high voltage as the gate on voltage in response to the plurality of scan pulses;

first to $n^{th}$ odd switching devices to forward the first gate low voltage as the gate off voltage in response to first to $n^{th}$ odd switching signals of the gate output control signal; and first to $n^{th}$ even switching devices to forward the second gate low voltage as the gate off voltage in response to first to $n^{th}$ even switching signals of the gate output control signal, where "n" is an integer greater than 0.

5. The device in claim 4, wherein:

the plurality of scan pulses are generated to supply the gate on voltages to the gate lines in every frame;

the first to $n^{th}$ odd switching signals are generated to turn on the first to $n^{th}$ odd switching devices after the gate on voltages are supplied in a first frame period, and before the gate on voltages are supplied in a second frame period; and the first to $n^{th}$ even switching signals are generated to turn on the first to $n^{th}$ even switching devices before the gate on voltages are supplied in the first frame period, and after the gate on voltages are supplied in the second frame period.

6. The device in claim 5, wherein:

the gate voltage swings to the second gate low voltage, the gate high voltage, and the first gate low voltage in every odd frame; and the gate voltage swings to the first gate low voltage, the gate high voltage, and the second gate low voltage in every even frame.

7. The device in claim 6, wherein:

the common voltage swings to a low voltage in every odd frame; and the common voltage swings to a high voltage in every even frame.

8. The device in claim 4, wherein:

the first gate low voltage level:

maintains one voltage level lower than the gate high voltage; or swings to a voltage between two voltage levels, one of the two voltage levels being lower than the gate high voltage, and the other of the two voltage levels being higher than the second gate low voltage; and the second gate low voltage level swings between two voltage levels that are equal to or lower than the first gate low voltage in every frame.

9. A method for driving a liquid crystal display, the method comprising:

generating a common voltage, wherein a level of the common voltage swinging every frame;

supplying the generated common voltage to a liquid crystal panel;

controlling a gate driver to generate a gate driving voltage, a level of the gate driving voltage varying in accordance with the common voltage swinging level, the controlling the gate driver comprising generating a gate control signal to supply a gate on voltage to gate lines of the liquid crystal display;

generating a gate output control signal to supply a gate off voltage with varying levels when the gate on voltage is not supplied; and supplying the gate control signal and the gate output control signal to the gate driver, wherein first to $n^{th}$ odd switching signals of the gate output control signal are generated to forward a first gate low voltage as the gate off voltage after the gate on voltages are supplied in a first frame period, and before the gate on voltages are supplied in a second frame period, where "n" is an integer greater than 0, and first to $n^{th}$ even switching signals are generated to forward a second gate low voltage as the gate off voltage before the gate on voltages are supplied in the first frame period, and after the gate on voltages are supplied in the second frame period.

10. The method of claim 9, wherein the controlling a gate driver comprises:

generating a plurality of scan pulses in response to the gate control signal;

supplying the plurality of gate on voltages to the gate lines in response to the plurality of scan pulses;

changing the gate off voltage to the first or second gate low voltage level; and supplying the changed gate off voltage to the gate lines according to the gate output control signal when no gate on signal is supplied.

11. The method of claim 10, wherein the changing the gate off voltage to a first or second gate low voltage level and supplying the changed gate off voltage to the gate lines comprises:

forwarding the first gate low voltage as the gate off voltage according to first to $n^{th}$ odd switching signals of the gate output control signal using first to $n^{th}$ odd switching devices, respectively; and forwarding the second gate low voltage as the gate off voltage according to first to $n^{th}$ even switching signals of the gate output control signal using first to $n^{th}$ even switching devices, respectively.

12. The method of claim 10, wherein:

the plurality of scan pulses are generated to supply the gate on voltages to the gate lines in every frame;

the first to $n^{th}$ odd switching signals are generated to turn on the first to $n^{th}$ odd switching devices after the gate on voltages are supplied in a first frame period, and before the gate on voltages are supplied in a second frame period;

the first to $n^{th}$ even switching signals are generated to turn on the first to $n^{th}$ even switching devices before the gate on voltages are supplied in the first frame period, and after the gate on voltages are supplied in the second frame period.

13. The method of claim 10, wherein:

the first gate low voltage level maintains one voltage level lower than the gate high voltage, or swings to a voltage between two voltage levels wherein one of the two voltage levels is lower than the gate high voltage and the other of the two voltage levels is higher than the second gate low voltage; and the second gate low voltage level swings between two voltage levels that are equal to or lower than the first gate low voltage in every frame.

14. The method of claim 10, wherein:

the gate voltage swings to the second gate low voltage, the gate high voltage, and the first gate low voltage in every odd frame; and the gate voltage swings to the first gate low voltage, the gate high voltage, and the second gate low voltage in every even frame.

15. The method of claim 14, wherein:

the common voltage swings to a low voltage in every odd frame, and the common voltage swings to a high voltage in every even frame.

16. A device, comprising:

a liquid crystal panel comprising a plurality pixel regions formed thereon;

a data driver to drive data lines on the liquid crystal panel;

a gate driver to drive gate lines on the liquid crystal panel;

a driving voltage generating unit to generate a common voltage wherein a level of the common voltage swings every $n^{th}$ frame, wherein n is an integer equal to or greater than 2; and a timing controller to control the driving voltage generating unit and the gate driver to generate a gate driving voltage wherein a level of the gate driving voltage varies in accordance with the common voltage swinging level, wherein the timing controller comprises a gate control signal generating unit to generate a gate control signal to supply a gate on voltage to the gate lines, and a gate output control signal to change a level of a gate off voltage and supply the changed gate off voltage to the gate driver when the gate on voltage is not supplied, wherein the gate driver comprises an output voltage control unit to supply the plurality of gate on voltages to the gate lines in response to a plurality of scan pulses and change the gate off voltage to a first or second gate low voltage level in response to the gate output control signal and supply the changed gate off voltage to the gate lines when no gate on voltages are supplied, wherein first to $n^{th}$ odd switching signals of the gate output control signal are generated to forward a first gate low voltage as the gate off voltage after the gate on voltages are supplied in a first frame period, and before the gate on voltages are supplied in a second frame period, and wherein first to $n^{th}$ even switching signals are generated to forward a second gate low voltage as the gate off voltage before the gate on voltages are supplied in the first frame period, and after the gate on voltages are supplied in the second frame period.

17. The device in claim 16, wherein the timing controller further comprises:

an image processing unit to receive and align an external image data and supply the aligned image data to the data driver; and a data control signal generating unit to generate a data control signal using at least one external synchronizing signal and supply the data control signal to the data driver.

18. The device in claim 17, wherein the gate driver further comprises:

a shift register to generate and forward a plurality of scan pulses in response to the gate control signal.

* * * * *